United States Patent
LaFleur

[19]
[11] Patent Number: 5,815,268
[45] Date of Patent: Sep. 29, 1998

[54] LITHOGRAPHIC LENS WAVEFRONT AND DISTORTION TESTER

[75] Inventor: L. David LaFleur, Brookfield, Conn.

[73] Assignee: Raytheon Company, Lexington, Mass.

[21] Appl. No.: 672,291

[22] Filed: Jun. 28, 1996

[51] Int. Cl.⁶ .................................................. G01B 9/02
[52] U.S. Cl. ......................................................... 356/359
[58] Field of Search .................................. 356/358, 359, 356/360, 363

[56] References Cited

U.S. PATENT DOCUMENTS

| | | | |
|---|---|---|---|
| 3,506,361 | 4/1970 | Erickson | 356/360 |
| 4,696,572 | 9/1987 | Ono | 356/360 |
| 4,798,468 | 1/1989 | Ohuchi | 356/359 |

Primary Examiner—Samuel A. Turner
Attorney, Agent, or Firm—W. C. Schubert; G. H. Lenzen, Jr.

[57] ABSTRACT

A measurement device (2) for measuring a collimated wave front through a lithographic lens includes a radiant energy source (4), a lens group (6) for collimating light emitted from said radiant energy source and directing said collimated light (7) toward a reference surface (10). A first binary optic (12) disposed in line with said collimated light and located adjacent to an input conjugate of a lens under test. A second binary optic (18) is arranged in a spaced relationship and in line with said first binary optic for retroreflecting light passing through a lithographic lens disposed between said first and second binary optics. A recording system (8,9) is provided for recording an interference with the light retroreflected-reflected back through said lens and through said reference surface.

10 Claims, 2 Drawing Sheets

LITHOGRAPHIC LENS WAVEFRONT AND DISTORTION TESTER

BACKGROUND OF THE INVENTION

The present invention relates to an interferometer and deals more particularly with such a measurement device which can be used in the manufacture of flat panel display lithographic lenses, lenses used for photoresist development, large field printed circuit board optical lithographic system, or a multielement stepper lens for microcircuit fabrication whereby such manufacture can be performed more cost efficiently.

Conventionally, in measuring transmitted wavefront through a medium, a point source is translated to each field position and a single transmitted wavefront measurement is performed. Many of these steps must be performed to gather a full field of transmitted wavefront data. Hitherto, this process took several days. The present invention however, measures a full field in a fraction of a day while also gathering distortion data.

Accordingly it is an object of the invention to provide a device whereby a transmitted wavefront can be measured simultaneously along with distortion at many field positions.

SUMMARY OF THE INVENTION

The invention resides in a measurement device for simultaneously measuring a transmitted wavefront in a lithographic lens comprising a radiant energy source, a means for collimating light emitted from the radiant energy source and directing the collimated light toward a reference surface. A first binary optic is provided and is disposed in line with the collimated light and located adjacent to an input conjugate of a lens under test. A second binary optic is arranged in a spaced relationship and in line with the first binary optic for retro-reflecting light passing through a lithographic lens disposed between the first and second binary optics. A recording means is provided for recording an interference with the light retro-reflected back through the lens and reflected from the reference surface.

Preferably, the reference surface is a transmission flat and the means for collimating light emitted from the radiant energy means includes a collimating lens which has a diameter at least as large as that of the field of the lithographic lens being tested.

Ideally, the first binary optic is a mask which creates an array of point sources at an input conjugate of the lithographic lens and the second binary optic has a retro-reflective property which redirects light collimated through a lithographic lens under test back through the lens and toward the transmission flat.

Preferably, the recording means includes a beam splitter disposed between the light collimating means and the transmission flat for redirecting light outwardly of the path otherwise traveled between the transmission flat and the light collimating means and the recording means further includes a video camera which records interference with light reflected from the transmission flat.

In other embodiments, the transmission flat includes modulating means for modulating the transmission flat to accomplish phase measuring interference or the second binary optic being connected to a modulating means for effecting phase measuring interference. The calibration of the measurement device may be accomplished by placing the second binary optic above the first binary optic and storing the resulting phase maps.

DETAILED DESCRIPTION OF THE PREFERRED EMBODIMENT

Figure 1:
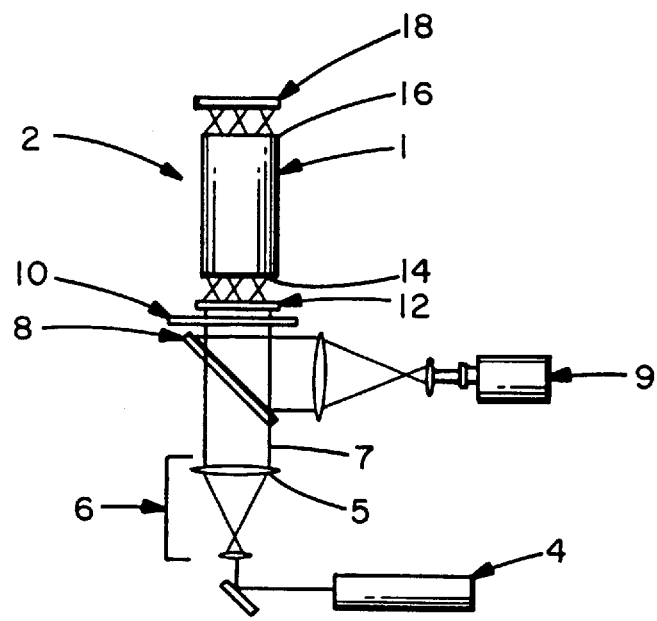
FIG. 1 is a schematic of the testing system of the present invention.

The interferometer of the present invention is shown generally in FIG. 1 and labeled generally as 2. The interferometer is shown testing a lithographic lens 1. The interferometer includes a radiant energy means or laser 4 and a light collimator group 6 including a collimating lens 5. Collimated light 7 passing from the group 6 travels through a beamsplitter 8 which is provided for imaging purposes since the split beam is redirected at a video camera 9. The collimated light passing from the beamsplitter 8 has a wavefront which then travels through a transmission flat 10, which is provided to be the reference surface for all field positions.

Figure 2:
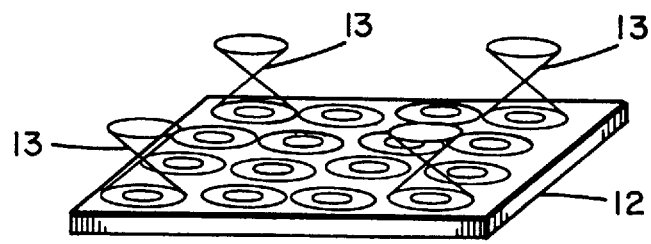
FIG. 2 is a schematic of the first binary optic associated with the input conjugate of the lens under test.

As illustrated in FIG. 2, the collimated wavefront, passing from the transmission flat is of a diameter of the largest field dimension and is incident on a first binary optic 12 which is disposed adjacent the input conjugate 14 of the lens 1 under test. The first binary optic 12 generates an array of point sources 13 of the appropriate f-stop number for the lens under test. The first binary optic is a mask with transparent portions creating an array of point sources at an input conjugate of the lithographic lens. These point sources are placed at the input conjugate of the lithographic lens.

Figure 3:
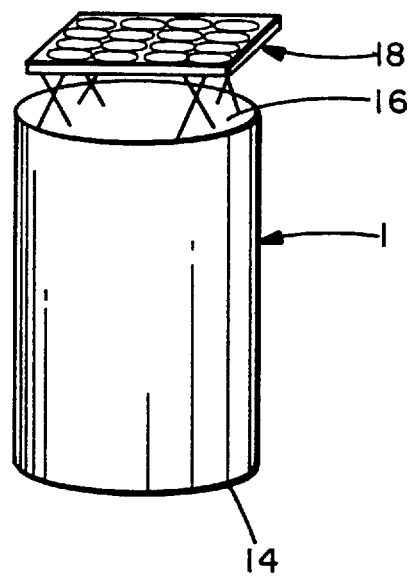
FIG. 3 is a schematic of the a lens under test shown with the second retro-reflecting binary optic.

As seen in FIG. 3, the lens 1 re-images the point sources at an output conjugate 16. This reimaged light will then be retro-reflected back through the lens 1 and through the first binary optic 12 by a second binary optic 18 having reflective properties. After exiting the first binary optic 12, the retro-reflected light is recollimated. The recollimated light or collimated bundles of retro-reflected light will interfere with light reflected from the transmission flat 10. The beamsplitter redirects this light to the video camera which records the interference.

The interferometer can be used as phase measuring interferometer by either modulating the transmission flat 10 or the second binary optic 18. Software analysis can be performed on the wavefront data for the various apertures on the video camera. The amount of tilt in the interferograms can be related to distortion. For a 1× magnification system (like some lithographic lenses), the interferometer can be calibrated by placing the retroreflector binary optic above the point source binary optic and storing the resulting phase maps. For systems not of unity magnification, the interferometer must be calibrated by other methods.

I claim:

1. A measurement device for simultaneously measuring transmitted wavefront and distortion for all field positions of a lithographic lens comprising:

a radiant energy source;

a means for collimating light emitted from said radiant energy source and directing said collimated light toward a reference surface;

a first binary optic disposed in line with said collimated light and located adjacent an input conjugate of a lens under test;

a second binary optic arranged in a spaced relationship and in line with said first binary optic for retroreflecting light passing through a lithographic lens disposed between said first and second binary optics; and recording means for recording an interference with the light retro-reflected back through said lens and the light reflected said reference surface.

2. A measurement device as defined in claim 1 further characterized in that said reference surface is a transmission flat.

3. A measurement device as defined in claim 1 further characterized in that said means for collimating light emitted from said radiant energy means includes a collimating lens which has a diameter at least as large as the field size of the lithographic lens being tested.

4. A measurement device as defined in claim 3 further characterized in that said first binary optic is a mask which creates an array of point sources at an input conjugate of the lithographic lens.

5. A measurement device as defined in claim 4 further characterized in that said second binary optic has a retro-reflective property which redirects light passing through a lithographic lens under test back through said lens and toward said transmission flat.

6. A measurement device as defined in claim 5 further characterized in that said recording means includes a beam splitter disposed between said light collimating means and said transmission flat for redirecting light outwardly of the path otherwise traveled between said transmission flat and said light collimating means.

7. A measurement device as defined in claim 6 further characterized in that said recording means further includes a video camera which records interference with light reflected from the transmission flat and collimated bundles of retro-reflected light.

8. A measurement device as defined in claim 1 further characterized in that said transmission flat includes modulating means for modulating said transmission flat to accomplish phase measuring interference.

9. A measurement device as defined in claim 8 further characterized by said second binary optic being connected to a modulating means for effecting phase measuring interference.

10. A measurement device as defined in claim 1 further characterized by calibrating said measurement device by placing said second binary optic above the first binary optic and storing the resulting phase maps.

* * * * *